United States Patent
Hawkins, Jr.

(10) Patent No.: US 8,448,768 B2
(45) Date of Patent: May 28, 2013

(54) CLUTCH TOOTH INDEX AND STEP FOR MULTIPLE CAST CLUTCHES IN ONE HOUSING

(71) Applicant: Glen S. Hawkins, Jr., Indianapolis, IN (US)

(72) Inventor: Glen S. Hawkins, Jr., Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/647,053

(22) Filed: Oct. 8, 2012

(65) Prior Publication Data
US 2013/0032446 A1 Feb. 7, 2013

Related U.S. Application Data

(63) Continuation of application No. 12/486,606, filed on Jun. 17, 2009, now Pat. No. 8,281,916.

(60) Provisional application No. 61/073,682, filed on Jun. 18, 2008.

(51) Int. Cl.
*F16D 25/10* (2006.01)
*F16D 13/68* (2006.01)

(52) U.S. Cl.
USPC .............. 192/48.611; 192/70.2; 192/112

(58) Field of Classification Search
USPC ............ 192/48.606, 48.611, 48.618, 70.2, 192/112
See application file for complete search history.

(56) References Cited

U.S. PATENT DOCUMENTS

| 4,940,124 | A | 7/1990 | Galuska et al. |
| 8,281,916 | B2 * | 10/2012 | Hawkins ............ 192/48.611 |
| 2007/0107545 | A1 | 5/2007 | Seipold |
| 2007/0175725 | A1 | 8/2007 | Sawayanagi |

FOREIGN PATENT DOCUMENTS

JP 5141445 6/1993

OTHER PUBLICATIONS

Machine translation of JP 5141445 A downloaded Jan. 12, 2012.

* cited by examiner

*Primary Examiner* — Richard M. Lorence
(74) *Attorney, Agent, or Firm* — Barnes & Thornburg LLP

(57) ABSTRACT

A housing for a multi-stage clutch assembly is formed to include a shoulder upon which a backing plate of a first stage clutch pack may be positioned to transfer a load from the first stage clutch pack to the housing.

20 Claims, 3 Drawing Sheets

CLUTCH TOOTH INDEX AND STEP FOR MULTIPLE CAST CLUTCHES IN ONE HOUSING

This application claims the benefit, under 35 U.S.C. §120, of U.S. application Ser. No. 12/486,606 which claims the benefit, under 35 U.S.C. §119(e), of U.S. Provisional Patent Application No. 61/073,682, filed Jun. 18, 2008, the disclosures of each of which are incorporated by reference herein in their entirety.

BACKGROUND OF THE INVENTION

The present disclosure is related to clutch assemblies in automatic transmissions. More specifically, the present disclosure is related to housings which are keyed to support multiple clutch stages in the same housing.

Multi-stage automatic transmissions have housings with splines acting as keys for mounting reaction plates. A housing supporting multiple stages of reaction plates has internal splines which are aligned across the stages. A first stage of reaction plates must be passed over the splines to an internal position. A second stage of reaction plates is keyed to the same splines but must be positioned on the splines so as not to contact the first stage when either the first stage or second stage is activated.

SUMMARY OF THE INVENTION

According to the present disclosure one or more of the features recited in the appended claims and/or the following features, alone or in any combination, may comprise patentable subject matter:

An automatic transmission comprises a housing, a first clutch pack supported in the housing, a second clutch pack supported in the housing, and a separator. The separator is positioned between the first clutch pack and the second clutch pack and coupled to the housing to transfer the load of the first clutch pack to the housing. The separator may be free to move relative to the housing when the first clutch pack is not energized.

The housing may be formed to include a shoulder upon which the separator acts when the clutch pack is energized. The housing may comprise a first stage support portion and a second stage support. The first stage support may include a plurality of first stage splines positioned about the inner surface of the housing. The second stage support portion may also include a plurality of second stage splines positioned about an inner surface of the housing.

The first clutch pack may include a plurality of first reactions plates supported in the first stage support. The second clutch pack may include a plurality of second reaction plates supported in the second stage support. The first stage splines may be formed to include an upper surface spaced apart from an inner surface of the housing a first distance. The second stage splines may be formed to include an upper surface spaced apart from the inner surface of the housing a second distance greater than the first distance to form a shoulder. The separator may engage the shoulder.

A multi-stage clutch assembly comprises a housing, a plurality of first reaction plates, a plurality of second reaction plates and a backing plate. The housing includes a first stage support portion and a second stage support portion. The plurality of first stage reaction plates are supported in the first stage and the plurality of second stage reaction plates are supported in the second stage. The backing plate is engaged with the housing and positioned between the first stage and the second stage. The backing plate is configured to transfer a load from the first stage directly to the housing.

The second stage reaction plates have an outer diameter and the first stage reaction plates may have an outer diameter greater than the outer diameter of the second stage reaction plates. The housing may be formed to include a shoulder which is configured to receive the backing plate.

The first stage support portion may comprise a plurality of first stage splines positioned about the inner surface of the housing. The second stage support portion may also comprise a plurality of second stage splines positioned about an inner surface of the housing. The first stage splines are formed to include an upper surface spaced apart from an inner surface of the housing a first distance. The second stage splines may be formed to include an upper surface spaced apart from the inner surface of the housing a second distance greater than the first distance to form the shoulder.

A housing for a multi-stage clutch assembly comprises a first stage support portion configured to support a plurality of first reaction plates, and a second stage support portion configured to receive a plurality of second reaction plates. The housing is formed to include a shoulder upon which a backing plate of a first stage clutch pack may be positioned to transfer a load from the first stage clutch pack to the housing, the shoulder acting as a stop for the backing plate.

The first stage support portion may comprise a plurality of first stage splines positioned about the inner surface of the housing. The second stage support portion may also comprise a plurality of second stage splines positioned about an inner surface of the housing. The second stage splines may be formed in groups, splines in the groups formed at a first spacing and the groups of splines spaced apart by a second spacing greater than the first.

Each second stage spline may have first and second side surfaces. The first side surface may extend to form a first side surface of a first first stage spline. The second side surface may extend to form a second side surface of a second first stage spline. The spacing between second stage splines within a group may be the same as the spacing between the first stage splines in the group.

The first stage splines is formed to include an upper surface spaced apart from an inner surface of the housing a first distance. The second stage splines may be formed to include an upper surface spaced apart from the inner surface of the housing a second distance greater than the first distance to form a shoulder.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
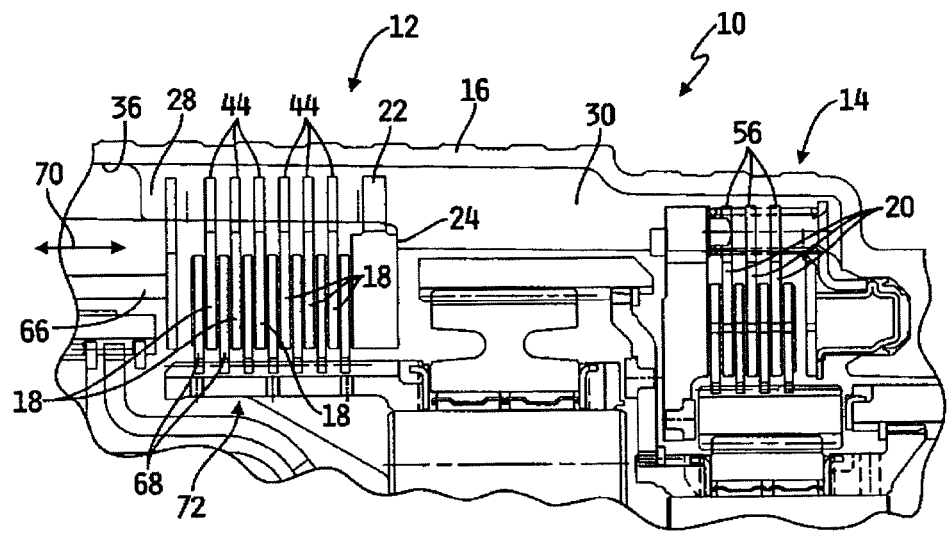
FIG. 1 is a diagrammatic representation of a cross-sectional view of a portion of an automatic transmission with portions cut-away.

An automatic transmission 10 according to the present disclosure includes a first stage 12 and a second stage 14 as shown in FIG. 1. The stages 12 and 14 are contained in a housing 16. The housing 16 is formed to include a plurality of splines 30 which engage a group of reaction plates 20 in the second stage 14. The housing 16 is also formed to include a series of splines 28 which are configured to receive a group of reaction plates 18 in the first stage 12.

A backing plate 22 of the first stage 12 engages a shoulder 24 formed in the housing 16 and the movement of the reaction plates 18 of the first stage 12 is limited by the backing plate 22. The shoulder 24 acts as a stop for the backing plate 22. Thus, the backing plate 22 separates the first stage 12 and the second stage 14 such that each stage may be activated independently. The interaction of the backing plate 22 with the shoulder 24 results in forces of activation of the first stage 12 being transferred directly to the housing 16 through the shoulder 24.

Figure 2:
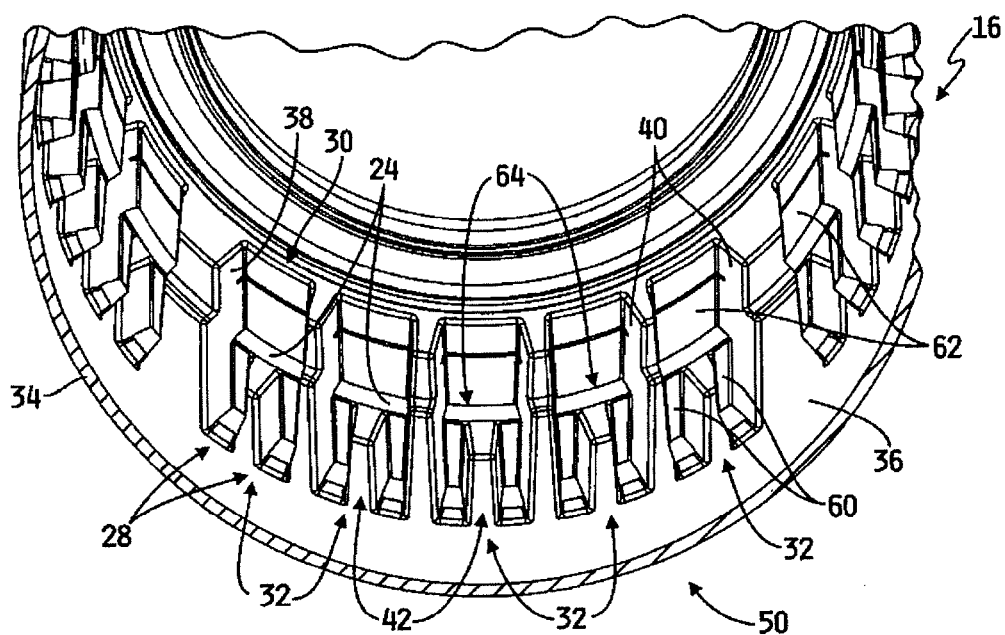
FIG. 2 is a perspective end view of a portion of the housing of FIG. 1.

The housing 16 is configured to permit the second stage reaction plates 20 to be inserted over the splines 28. Referring now to FIG. 2, the housing 16 is shown with portions cutaway. The splines 28 and 30 are each formed as part of a spline structure 32. The spline structures 32 are positioned about an inner surface 36 of a wall 34 of the housing 16. Each spline structure 32 forms a pair of splines 28 and a single spline 30. Each spline structure 32 is formed to include a pair of side surfaces 38 and 40. The side surfaces 38 and 40 of splines 28 are coplanar to the side surfaces of splines 30. The splines 28 are spaced apart about the surface 36 with a first spline 28 of a pair of splines 28 sharing a side surface 38 with a spline 30. The second spline 28 of the pair shares a side surface 40 with the spline 30.

Each spline structure 32 is formed such that the pair of splines 28 are spaced apart to define a channel 42 therebetween. Each reaction plate 18 is formed to include a number of tangs 44 about the outer perimeter of the reaction plate 18 as shown in FIG. 5. The channels 42 are formed to be sized to receive the tangs 44 when the reaction plates 18 are inserted into housing 16. The interaction of the tangs 44 and the channels 42 prevents rotation of the reaction plates 18 about an axis 46. However, the reaction plates 18 are free to float within the channels 42 along the axis 46 as suggested by arrow 48 in FIG. 4.

Figure 3:
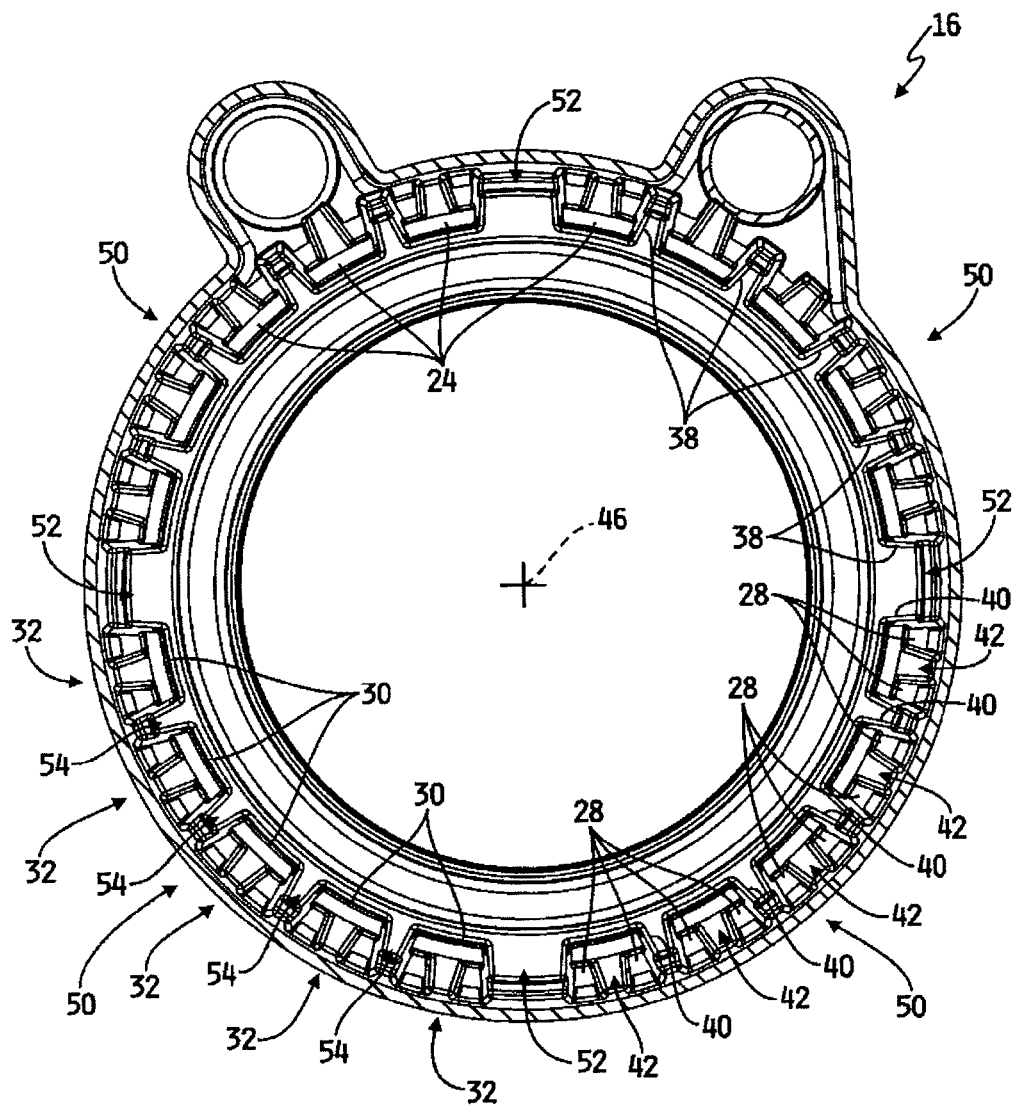
FIG. 3 is an end view of the housing of FIG. 2.

The housing 16 includes four groups 50 of spline structures 32 positioned about the surface 36 of housing 16 as shown in FIG. 3. The groups 50 are separated by channels 52. Within the groups 50, each of the spline structures 32 and thereby each of the splines 30 are separated by a channel 54. The reaction plates 20 of the second stage 14 are configured to have a plurality of tangs 56, 58 positioned about the circumference of the reaction plate 20. The tangs 56, 58 are arranged such that four tangs 56 are separated by a tang 58, as shown in FIG. 5. The tangs 56 are sized to be received in the channels 54 and the tangs 58 are sized to be received in the channels 52. When the reaction plates 20 are positioned in the housing 16, the tangs 56 and 58 are received in the channels 54 and 52 respectively such that the reaction plates 20 are prevented from rotating relative to the housing 16 about axis 46.

Referring again now to FIG. 2, the splines 28 are formed with an inner surface 60 which is spaced apart from the surface 36 by a first distance. The splines 30 are formed with an inner surface 62 which is spaced apart from the surface 36 by a second distance greater than the first spacing of splines 28. The diameter of reaction plates 20 is smaller than the diameter of reaction plates 18 allowing the reaction plates 20 to be passed over splines 28 to be positioned in the second stage 14 of the housing 16.

Once the reaction plates 20 are positioned in the housing 16, the reaction plates 18 may be positioned in the housing 16. In the illustrative embodiment, all of the surfaces of splines 28 and 30 are formed with a taper or draft to allow the housing 16 to be cast. As discussed above, a shoulder 24 is formed in a front surface 64 of the splines 30. The shoulder 24 is formed into the surface 64 so that the backing plate 22 of the first stage 12 may be positioned to engage the shoulder 24 when the stage 12 is installed in the housing 16. As seen in FIG. 1, an actuator 66 moves as suggested by an arrow 70. When the actuator 66 is energized, the actuator 66 engages a reaction plate 18 of a group 72 of clutch plates 68 to cause the clutch plates 68 to engage the reaction plates 18. Effectively, the actuator 66 clamps the clutch pack including the reaction plates 18 and the clutch plates 68 between the actuator 66 and the backing plate 22. The load of the actuator 66 is transferred through the clutch pack and the backing plate 22 to the shoulders 24 of the housing 16. Thus, the load of the actuator 66 is borne by the shoulders 24 formed on splines 30 and ultimately carried by the housing 16.

Figure 4:
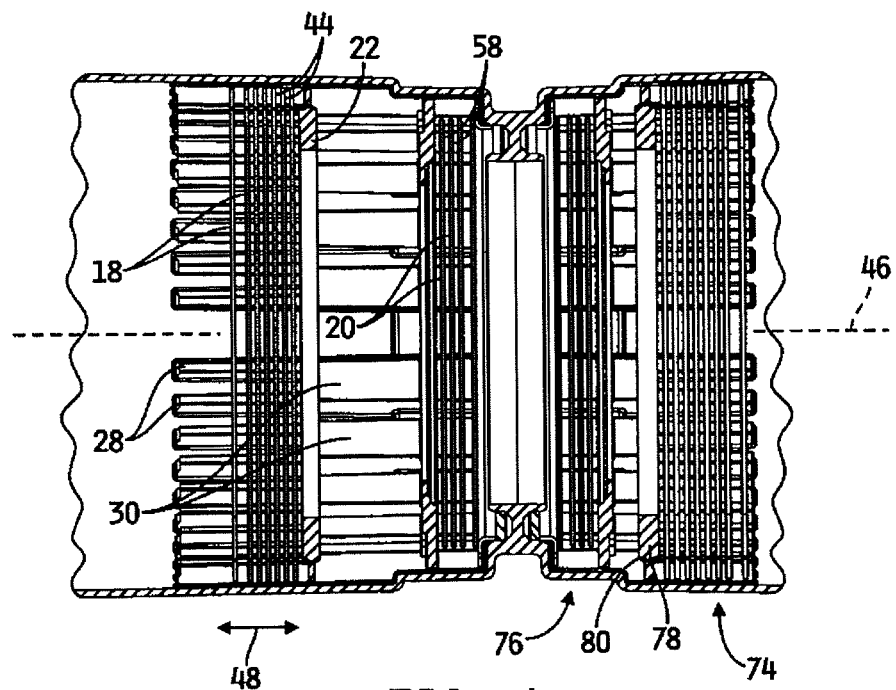
FIG. 4 is a cross-sectional view of a two-stage clutch housing of the transmission of FIG. 1.
Figure 5:
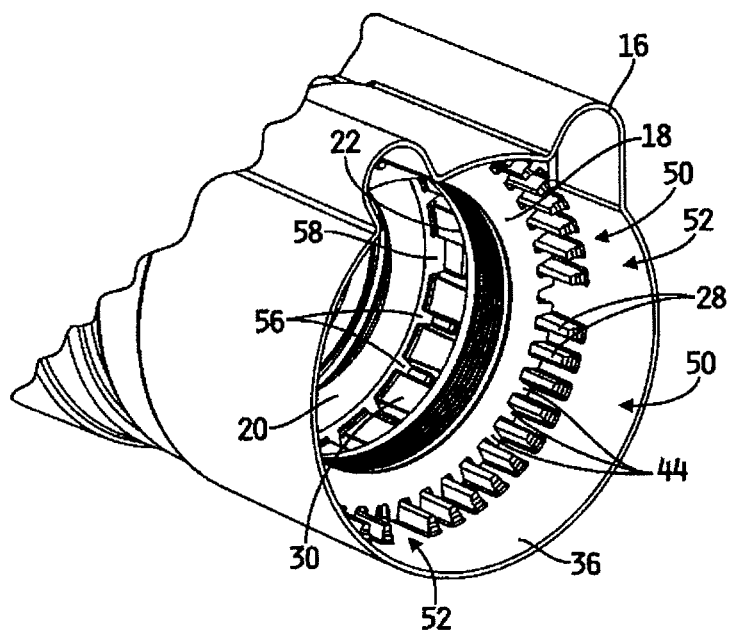
FIG. 5 is a view similar to FIG. 2 with the reaction plates positioned in the housing.

Referring now to FIG. 4, the housing 16 is shown to support the stages 12 and 14 as well as two additional stages 74 and 76. The stages 74 and 76 are configured in a manner similar to stages 12 and 14 such that a backing plate 78 of the stage 74 is positioned against a shoulder 80 formed in the housing 16.

While the embodiment disclosed herein is directed to a portion of a housing in which two stages are inserted, it should be understood that the principle of having decreasing diameter reaction plates in a multiple stage clutch assembly could accommodate more than two stages and may easily be extended to three or four or even more stages. The use of a backing plate such as backing plate 22 seated against a shoulder such as shoulder 24 in progressive stages could be used in additional stages to facilitate assembly with the load being borne by the additional shoulders and, thereby, the housing 16.

Although certain illustrative embodiments have been described in detail above, variations and modifications exist within the scope and spirit of this disclosure as described and as defined in the following claims.

The invention claimed is:

1. A housing for a multi-stage clutch assembly comprising
a first stage support portion configured to support a plurality of first reaction plates and including a plurality of first stage splines, and
a second stage support portion configured to receive a plurality of second reaction plates and including a plurality of second stage splines,
wherein the second stage splines are arranged in groups, each of the groups spaced apart from one another by a first distance to form a first set of channels and each of the second stage splines within each group spaced apart from one another by a second distance to form a second set of channels, each of the second reaction plates includes a first set of tangs and a second set of tangs, and the first set of tangs are received in the second set of channels and the second set of tangs are received in the first set of channels when each of the second reaction plates is received in the second stage support portion.

2. The housing of claim 1, wherein the first distance is greater than the second distance.

3. The housing of claim 2, wherein each of the groups comprises at least five second stage splines.

4. The housing of claim 3, wherein the second set of channels comprises at least four channels formed in each group.

5. The housing of claim 3, wherein the housing comprises at least four groups of second stage splines.

6. The housing of claim 5, wherein the first set of channels comprises at least four channels.

7. The housing of claim 1, wherein the second stage splines prevent each of the second reaction plates from rotating relative to the housing about a first axis.

8. The housing of claim 6, wherein the first set of tangs comprises a plurality of groups, the plurality of groups including at least four groups.

9. The housing of claim 8, wherein each group of the plurality of groups comprises at least four tangs.

10. The housing of claim 9, wherein the second set of tangs comprises at least four tangs.

11. A housing for a multi-stage clutch assembly comprising
a first stage support portion configured to support a plurality of first reaction plates and including a plurality of first stage splines, and
a second stage support portion configured to support a plurality of second reaction plates and including a plurality of second stage splines,
wherein the first stage splines combine with the second stage splines to form a plurality of spline structures, each one of the plurality of spline structures formed from a combination of two first stage splines and one second stage spline and arranged in groups, each of the groups spaced apart from one another by a first distance to form a first set of channels and each of the spline structures within each group spaced apart from one another by a second distance to form a second set of channels, each of the second reaction plates includes a first set of tangs and a second set of tangs, and the first set of tangs are received in the second set of channels and the second set of tangs are received in the first set of channels when each of the second reaction plates is received in the second stage support portion.

12. The housing of claim 11, wherein each of the groups comprises at least five spline structures.

13. The housing of claim 12, wherein the second set of channels comprises at least four channels formed in each group.

14. The housing of claim 12, wherein the housing comprises at least four groups of spline structures.

15. The housing of claim 14, wherein the first set of channels comprises at least four channels.

16. A housing for a multi-stage clutch assembly comprising
a first stage support portion configured to support a plurality of first reaction plates and including a plurality of first stage splines, and
a second stage support portion configured to support a plurality of second reaction plates and including a plurality of second stage splines,
wherein the first stage splines combine with the second stage splines to form a plurality of spline structures, each one of the plurality of spline structures formed from a combination of two first stage splines and one second stage spline and arranged in groups, each of the groups spaced apart from one another by a first distance to form a first set of channels and each of the spline structures within each group spaced apart from one another by a second distance to form a second set of channels, each of the second reaction plates includes a first set of tangs and a second set of tangs, each tang included in the first set of tangs positioned between two tangs included in the second set of tangs, and the first set of tangs are received in the second set of channels and the second set of tangs are received in the first set of channels when each of the second reaction plates is received in the second stage support portion.

17. The housing of claim 16, wherein each of the groups comprises at least five spline structures.

18. The housing of claim 17, wherein the second set of channels comprises at least four channels formed in each group.

19. The housing of claim 18, wherein the first set of tangs comprises a plurality of groups, the plurality of groups including at least four groups.

20. The housing of claim 19, wherein each group of the plurality of groups comprises at least four tangs.

* * * * *